United States Patent
Ito

(10) Patent No.: US 12,007,091 B2
(45) Date of Patent: Jun. 11, 2024

(54) ROAD SURFACE DRAWING APPARATUS

(71) Applicant: KOITO MANUFACTURING CO., LTD., Tokyo (JP)

(72) Inventor: Tatsuki Ito, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/310,710

(22) Filed: May 2, 2023

(65) Prior Publication Data
US 2023/0272897 A1    Aug. 31, 2023

Related U.S. Application Data

(63) Continuation of application No. PCT/JP2021/041925, filed on Nov. 15, 2021.

(30) Foreign Application Priority Data

Nov. 16, 2020    (JP) ................... 2020-190449

(51) Int. Cl.
*F21S 43/20*     (2018.01)
*B60Q 1/00*      (2006.01)
(Continued)

(52) U.S. Cl.
CPC ............. *F21S 43/26* (2018.01); *F21S 43/14* (2018.01); *B60Q 1/0017* (2013.01);
(Continued)

(58) Field of Classification Search
CPC ... B60Q 2400/50; B60Q 1/0017; F21V 11/08; F21V 11/10; F21W 2103/60; F21S 43/26;
(Continued)

(56) References Cited

U.S. PATENT DOCUMENTS 10,928,029 B1 *   2/2021  Woo .................. F21S 43/26
2015/0085523 A1   3/2015  Gürtl et al.
(Continued)

FOREIGN PATENT DOCUMENTS

DE    102007038881 A1 *   3/2009  .............. G09G 3/32
DE    102018002729 A1 *  10/2019
(Continued)

OTHER PUBLICATIONS

International Preliminary Report on Patentability Chapter I (PCT/IB/373) and Written Opinion (PCT/ISA/237) with translation dated May 16, 2023 by The International Bureau of WIPO in corresponding International Patent Application No. PCT/JP2021/041925. (10 pages).

(Continued)

*Primary Examiner* — Erin Kryukova
(74) *Attorney, Agent, or Firm* — BUCHANAN INGERSOLL & ROONEY PC

(57) ABSTRACT

A road surface drawing apparatus includes: a plurality of light sources that is capable of individually emitting a light; a mask having a plurality of light-transmitting windows, each light-transmitting window arranged to receive the light from a corresponding light source of the plurality of light sources; a partition that partitions a space between the plurality of light sources and the mask into a plurality of subspaces, each subspace allocated for each light-transmitting window and the corresponding light source; and a common projection lens arranged to project the light transmitted through each light-transmitting window from the corresponding light source onto a road surface.

11 Claims, 8 Drawing Sheets

(51) Int. Cl.
  *F21S 43/14*     (2018.01)
  *F21W 103/60*    (2018.01)
  *F21Y 115/10*    (2016.01)
(52) U.S. Cl.
  CPC ..... *B60Q 2400/50* (2013.01); *F21W 2103/60* (2018.01); *F21Y 2115/10* (2016.08)
(58) Field of Classification Search
  CPC ....... F21S 43/20; F21S 43/14; F21Y 2113/10; F21Y 2113/13; F21Y 2105/10; F21Y 2115/10
  See application file for complete search history.

(56) References Cited

U.S. PATENT DOCUMENTS

2019/0113197 A1* 4/2019 Kamiya ................... F21S 43/14
2019/0322209 A1* 10/2019 Sugiyama ............... F21S 43/26

FOREIGN PATENT DOCUMENTS

| DE | 102020000293 | A1 | * | 7/2021 | |
| EP | 3636992 | A1 | * | 4/2020 | ............. F21S 43/14 |
| JP | 2015510674 | A | | 4/2015 | |
| JP | 2019085076 | A | * | 6/2019 | |
| JP | 2019085076 | A | | 6/2019 | |
| TW | M546331 | U | * | 8/2017 | |
| WO | 2017164328 | A1 | | 9/2017 | |

OTHER PUBLICATIONS

International Search Report (PCT/ISA/210) with translation dated Dec. 28, 2021 by the Japanese Patent Office as the International Searching Authority for International Application No. PCT/JP2021/041925. (4 pages).

* cited by examiner

ROAD SURFACE DRAWING APPARATUS

BACKGROUND OF THE INVENTION

1. Field of the Invention

The present invention relates to a road surface drawing apparatus.

2. DESCRIPTION OF THE RELATED ART

A drawing apparatus is known that draws a colored image by causing a plurality of lamp units to project images of different colors such that the images are superimposed at the same place in front (see, for example, patent document 1).
[Patent literature 1] JP2019-85076

The drawing apparatus described above is merely capable of displaying a colored image of a single type. Therefore, a plurality of drawing apparatuses need be prepared in order to draw a plurality of types of colored images or display an animation. A combination of a plurality of drawing apparatuses tends to increase the size of the apparatus as a whole. Drawing apparatuses that use digital micromirror devices (DMD) are also known, but such devices are expensive and require complicated control for drawing.

SUMMARY OF THE INVENTION

The present invention addresses the aforementioned issue, and an illustrative purpose thereof is to provide a compact and inexpensive road surface drawing apparatus that draws a plurality of types of images onto the road surface.

A road surface drawing apparatus according to an aspect of the present invention includes: a plurality of light sources that is capable of individually emitting a light; a mask having a plurality of light-transmitting windows, each light-transmitting window arranged to receive the light from a corresponding light source of the plurality of light sources; a partition that partitions a space between the plurality of light sources and the mask into a plurality of subspaces, each subspace allocated for each light-transmitting window and the corresponding light source; and a common projection lens arranged to project the light transmitted through each light-transmitting window from the corresponding light source onto a road surface.

According to this aspect, the road surface drawing apparatus can draw a plurality of types of images on the road surface by lighting the light sources individually, thereby switching between and projecting on the road surface the graphics respectively represented by the plurality of light-transmitting windows on the mask. The plurality of subspaces each having the light source and the light-transmitting window are partitioned by the partition and adjacent to each other and so can be arranged tightly as a whole. By using a common projection lens for the plurality of subspaces like this, the road surface drawing apparatus can be compactly designed. Further, the road surface drawing apparatus can be realized without using DMD and so can be provided inexpensively.

The plurality of light-transmitting windows on the mask may be arranged on a focal plane of the common projection lens. This makes it possible to project the shape of the graphic represented by each light-transmitting window on a projection plane via the projection lens, by illuminating the light-transmitting window with the corresponding light source.

The plurality of light-transmitting windows on the mask may be arranged on a surface inclined with respect to a principal plane of the common projection lens. This results in the plurality of light-transmitting windows and the projection lens being arranged at an angle to each other so that the light-transmitting window, the projection lens, and the road surface can be arranged according to the Scheimpflug principle. Distortion of the projected image on the road surface caused by non-parallel (typically, orthogonal) arrangement of the light-transmitting window and the road surface can be reduced.

The mask may be arranged adjacent to the plurality of light sources such that each light-transmitting window is directly illuminated by the corresponding light source. Optical elements such as reflectors and lenses are not provided between the light sources and the mask. This configuration results in compact size of the road surface drawing apparatus.

A distance from the corresponding light source to the mask may be in a range from 3 mm to 8 mm. In addition to or in place of this feature, the angle formed by the two straight lines connecting the corresponding light source and the edges of a subspace for the corresponding light source may be in a range from 35° to 65°. This makes it possible to fill the entire graphic represented by the light-transmitting window with incident light from the corresponding light source in the case the light sources provide typical light distribution (e.g., Lambertian light distribution).

The plurality of light-transmitting windows may be arranged to face a central part of an incidence surface of the projection lens. This makes it easy to suppress distortion in the projected image caused by aberration of the projection lens more successfully than in the case the light-transmitting window faces the outer circumferential part. Further, concentrated arrangement of the plurality of light-transmitting windows facilitates reduction in the size of the road surface drawing apparatus.

At least two light sources of the plurality of light sources may be configured to operate such that the at least two light sources are linked in timing of lighting and extinguishing. This makes it possible to display an animation on the road surface by lighting or extinguishing at least two light sources in a coordinated manner and using at least two light-transmitting windows respectively corresponding to these light sources.

At least two light-transmitting windows of the plurality of light-transmitting windows may have mutually different shapes and/or colors. This makes it possible to draw various images on the road surface.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

Figure 1:
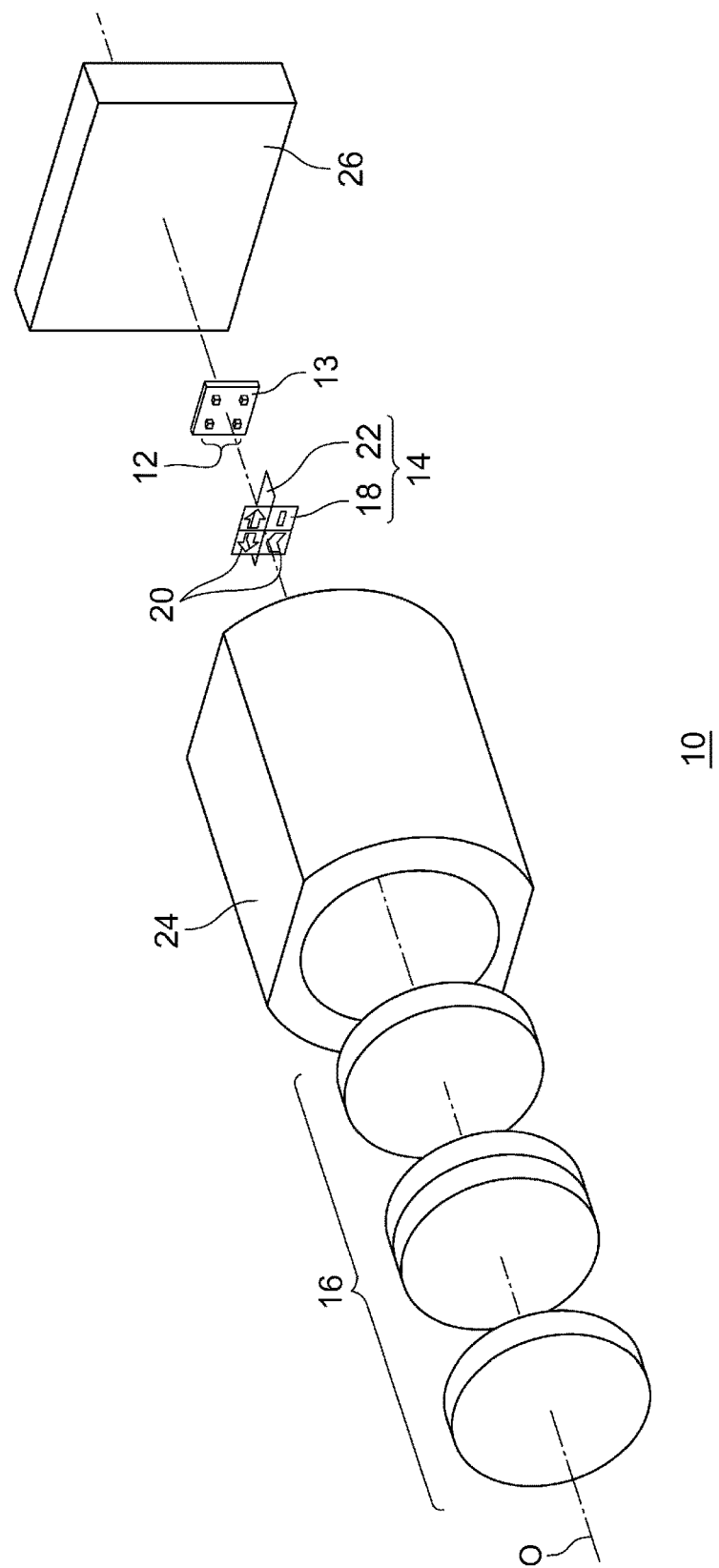
FIG. 1 is an exploded perspective view of the road surface drawing apparatus according to the embodiment.

The invention will now be described by reference to the preferred embodiments. This does not intend to limit the scope of the present invention, but to exemplify the invention.

Hereinafter, the present invention will be described based on preferred embodiments with reference to the accompanying drawings. The embodiments do not intend to limit the scope of the invention but exemplify the invention. Not all of the features and the combinations thereof described in the embodiments are necessarily essential to the invention. Identical or like constituting elements, members, processes shown in the drawings are represented by identical symbols and a duplicate description will be omitted as appropriate. The scales and shapes shown in the figures are defined for convenience's sake to make the explanation easy and shall not be interpreted limitatively unless otherwise specified. Terms like "first", "second", etc. used in the specification and claims do not indicate an order or importance by any means and are used to distinguish a certain feature from the others. Those of the members that are not important in describing the embodiment are omitted from the drawings.

Figure 2:
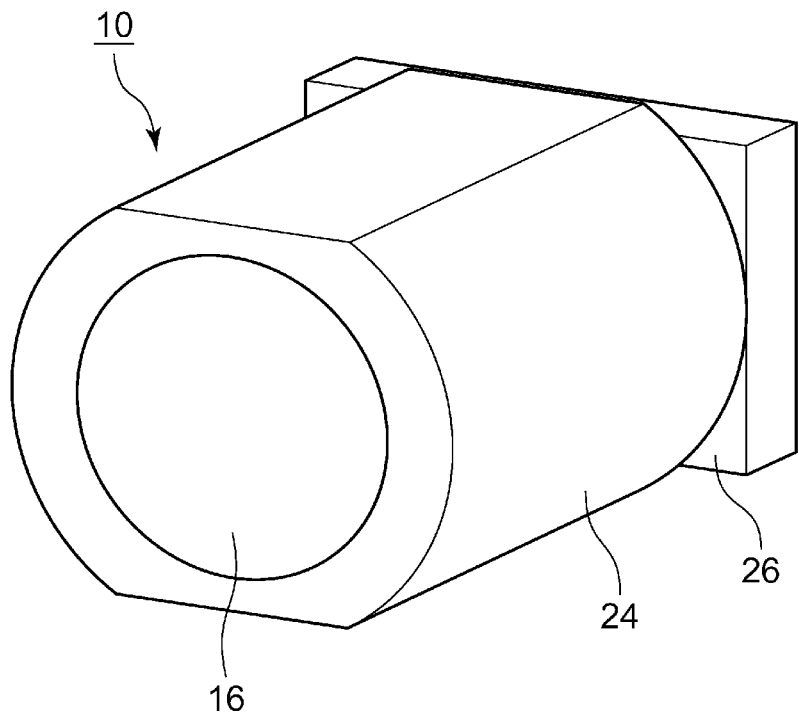
FIG. 2 is a schematic perspective view of the road surface drawing apparatus according to the embodiment.
Figure 3:
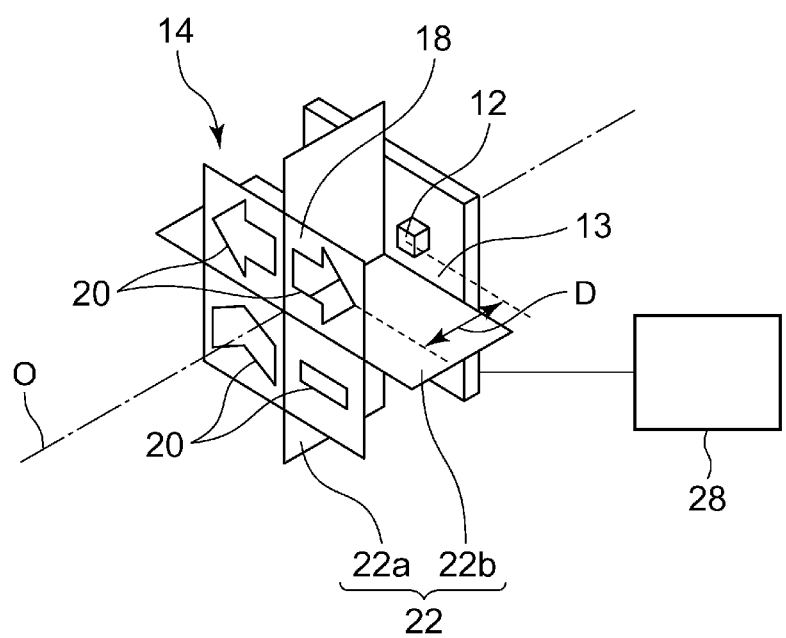
FIG. 3 is a schematic perspective view showing the light sources and the shade member inside the road surface drawing apparatus according to the embodiment.
Figure 4:
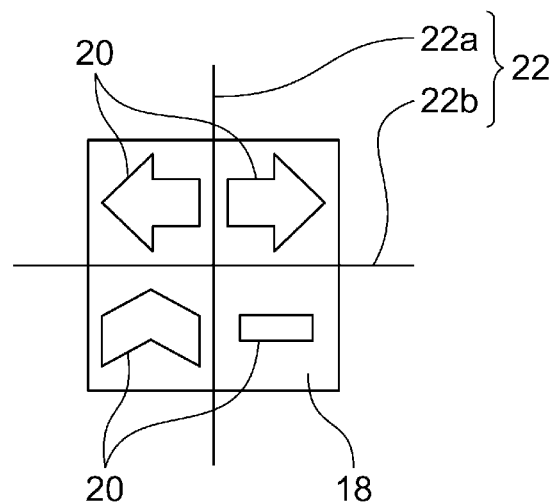
FIG. 4 is a schematic front view of the shade member shown in FIG. 3.
Figure 5:
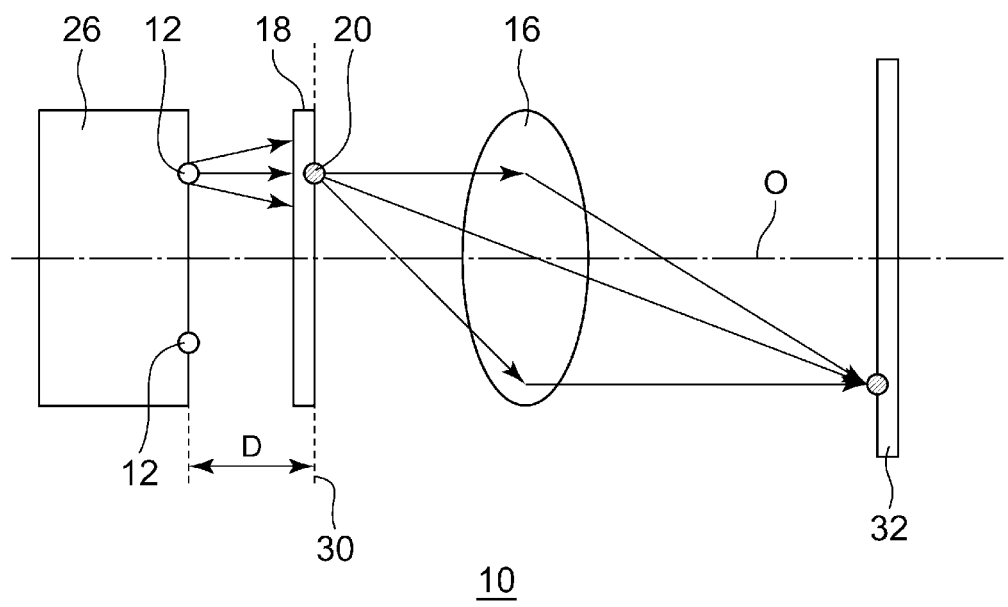
FIG. 5 is a schematic view showing the optical system of the road surface drawing apparatus according to the embodiment.
Figure 6:
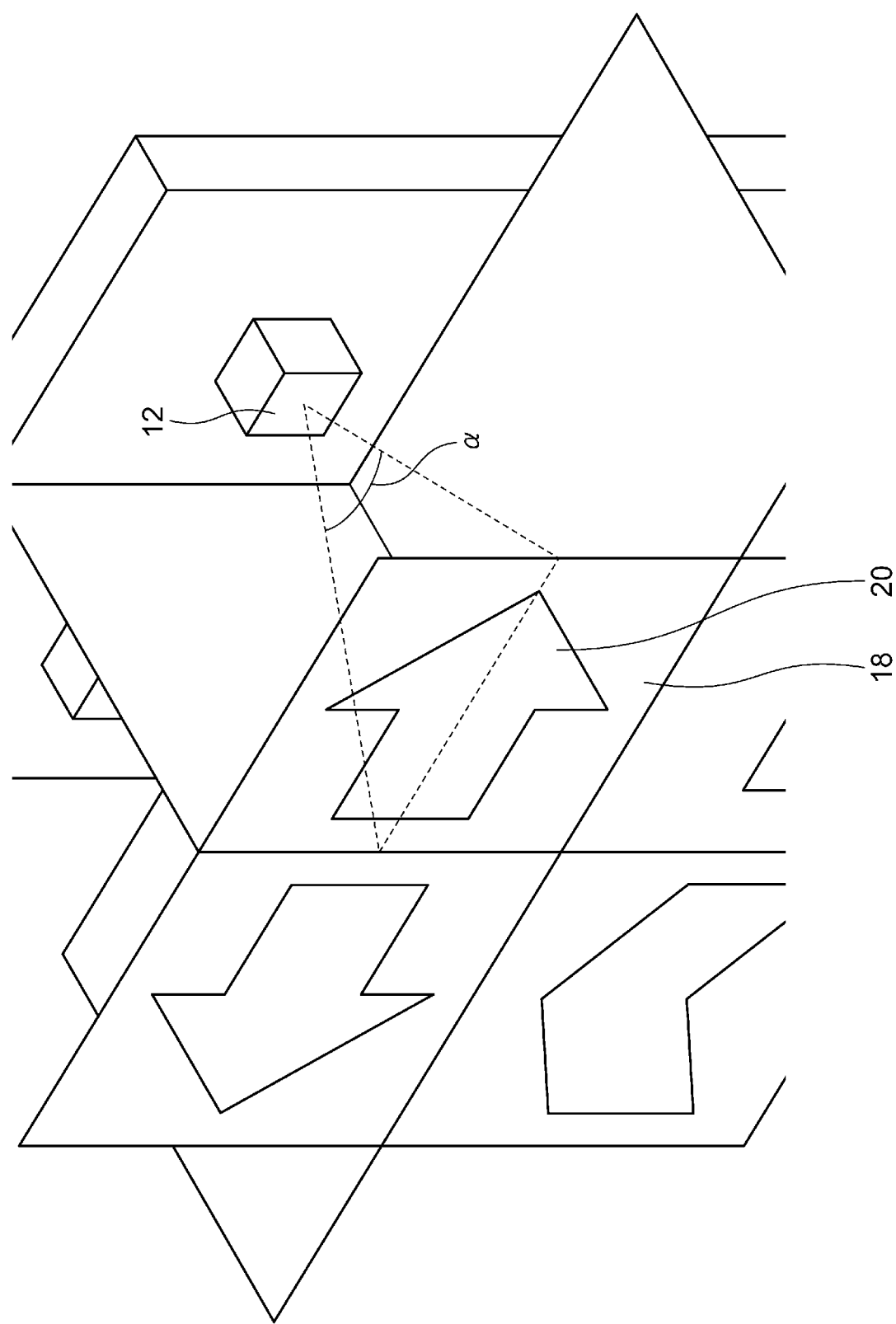
FIG. 6 is a schematic perspective view showing a portion of FIG. 3 on an enlarged scale.
Figure 7A:
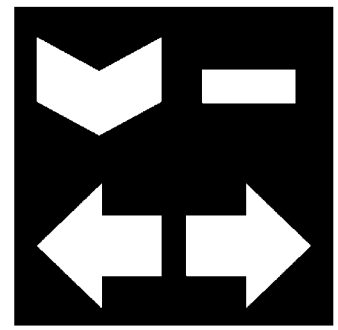
FIG. 7A shows a graphic projected by the road surface drawing apparatus onto the projection plane shown in FIG. 5.
Figure 7B:
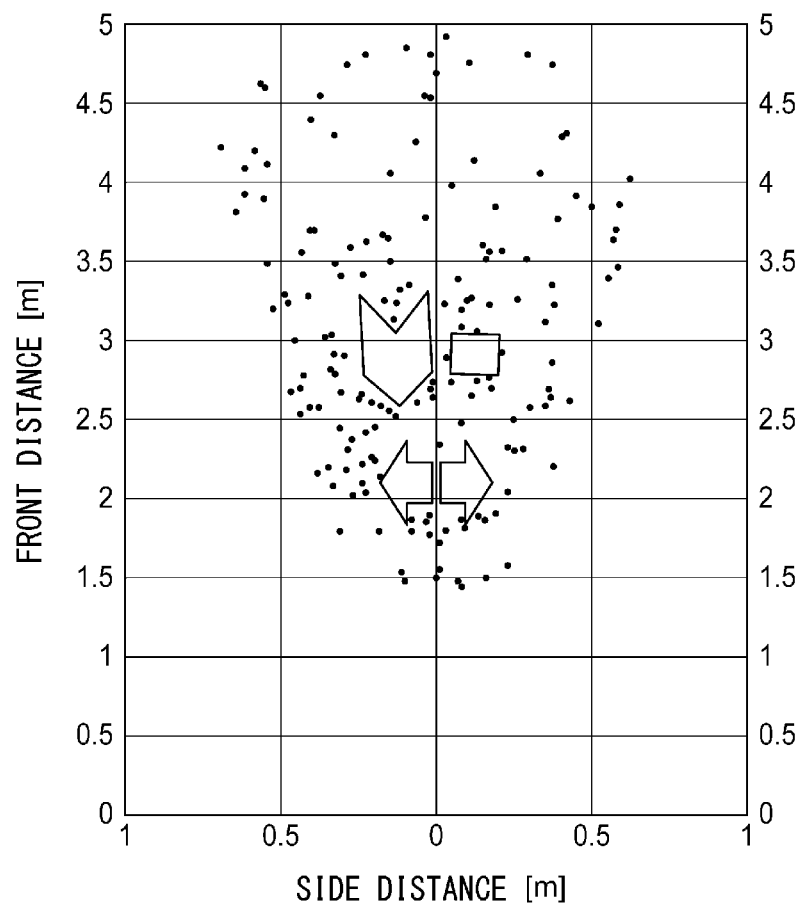
FIG. 7B shows a graphic projected by the road surface drawing apparatus onto the road surface.

FIG. 1 is an exploded perspective view of the road surface drawing apparatus according to the embodiment. FIG. 2 is a schematic perspective view of the road surface drawing apparatus according to the embodiment, FIG. 3 is a schematic perspective view showing the light sources and the shade member inside the road surface drawing apparatus according to the embodiment. FIG. 4 is a schematic front view of the shade member shown in FIG. 3. FIG. 5 is a schematic view showing the optical system of the road surface drawing apparatus according to the embodiment. FIG. 6 is a schematic perspective view showing a portion of FIG. 3 on an enlarged scale. FIG. 7 shows a graphic projected by the road surface drawing apparatus onto the projection plane shown in FIG. 5, and FIG. 7B shows a graphic projected by the road surface drawing apparatus onto the road surface.

A road surface drawing apparatus 10 is provided with, as shown in FIG. 1, a plurality of light sources 12, a shade member 14, and a projection lens 16. The shade member 14 is provided with a mask 18 having a plurality of light-transmitting window 20 and a partition 22. The detail will be described later. The road surface drawing apparatus 10 is also provided with a lens holder 24 for holding the projection lens 16 and a support member 26 that supports the light sources 2, the shade member 14, and the lens holder 24.

Each light source 12 is implemented in this embodiment by a light-emitting diode (LED), but the embodiment is non-limiting as to the type of light source. Other semiconductor light-emitting elements or optional optical light-emitting elements may be used. The light sources 12 are packaged on the front surface of a light source carrying substrate 13 facing the projection lens 16 and are arranged on the light source carrying substrate 13 relatively tightly in proximity to each other. The light emitting surface of each light source 12 is parallel to the front surface of the light source carrying substrate 13 and is oriented toward the projection lens 16. The light source 12 provides typical light distribution (e.g., Lambertian light distribution) in which most intense light is emitted light directly in front of the light emitting surface.

In this embodiment, four light sources 12 are provided to correspond to four light-transmitting windows 20 by way of example. The four light sources 12 are arranged on the light source carrying substrate 13 in a square matrix in proximity to the light axis O of the projection lens 16. The number of light sources 12 is determined in accordance with the number of light-transmitting windows 20 on the mask 18. A desired number of light-transmitting windows 20 may be provided on the mask 18, and a desired number of light sources 12 commensurate with the number of light-transmitting windows 20 may be provided.

The plurality of light sources 12 can be lighted individually. As shown in FIG. 3, the light source carrying substrate 13 may be connected to a control substrate 28 by arbitrary suitable electrical connection such as connector connection. The plurality of light sources 12 can be controlled by the control substrate 28 to be lighted or distinguished individually. The control substrate 28 may be connected to an external power source (not shown). The light source 12 can be powered from the external power source via the control substrate 28 and the light source carrying substrate 13.

Each light source 12 emits light of a desired color such as white light or light of other colors. All or some of the plurality of light sources 12 may emit light of the same color. Alternatively, all or some of the plurality of light sources 12 may emit light of mutually different colors.

The mask 18 is provided between the light sources 12 and the projection lens 16 such that the rear surface faces the light sources 12 and the front surface faces the projection lens 16. The mask 18 has, as shown in FIGS. 3 and 4, a plurality of light-transmitting windows 20. The mask 18 in this embodiment is a stencil mask, and each light-transmitting window 20 is an opening that extends from the front surface through the rear surface of the mask 18. The light-transmitting window 20 is formed by, for example, punching a plate-shaped mask substrate. The mask substrate is made of, for example, a metal material but may be made of a resin material or another suitable material.

At least two of the plurality of light-transmitting windows 20 may have different shapes. For example, all of the light-transmitting windows 20 may have mutually different shapes. Alternatively, all or some of the plurality of light-transmitting windows 20 may have the same shape.

The shape of each light-transmitting window 20 represents the graphic that should be projected onto the road surface. For example, the shape may represent a symbol such as an arrow and a straight line or represent an arbitrary character or number. By way of one example, one of the two upper light-transmitting windows 20 may be shaped in the form of a right arrow, and the other may be shaped in the form or a left arrow, as is clearly shown in FIG. 4. One of the two lower light-transmitting windows 20 may be shaped in the form of a shaft feather, and the other may be shaped in the form of a horizontal line.

Each of the plurality of light-transmitting windows 20 on the mask 18 is illuminated by the corresponding light source 12 of the plurality of light sources 12. In other words, the light-transmitting windows 20 and the light sources 12 are in one-to-one correspondence. One light source 12 is provided for each light-transmitting window 20 to illuminate that light-transmitting window 20. As described above, four light-transmitting windows 20 are provided on the mask 18 by way of one example, and these light-transmitting windows 20 are provided on the mask 18 in proximity to the projection lens light axis O.

The mask 18 is provided adjacent to the plurality of light sources 12 so that each light-transmitting window 20 is directly illuminated by the corresponding light source 12. Therefore, optical elements such as reflectors and lenses are not provided between the light sources 12 and the mask 18. This configuration makes it possible to arrange the light sources 12 and the mask 18 close to each other and to reduce the size of the road surface drawing apparatus 10.

The distance D from the light source 12 to the mask 18 shown in FIGS. 3 and 5 may be in a range from 3 mm to 8 mm. If the distance D is less than 3 mm, the light sources 12 are excessively near the light-transmitting windows 20 on the mask 18 so that the light from the light source 12 does not easily reach the outer circumferential part of the light-transmitting window 20 distanced outward from the center of the light emitting surface of the light source 12, which makes it difficult to project the shape of the light-transmitting window 20 accurately. If the distance D exceeds 8 mm, on the other hand, the light sources 12 are spaced apart from the mask 18 in the direction of the light axis O, and this leads to a large size of the apparatus in the light axis direction. By configuring the distance D to be in a range from 3 mm to 8 mm, therefore, it is ensured that the light from the light source 12 illuminates the entirety of the corresponding light-transmitting window 20 to project the shape of the light-transmitting window 20 onto the road surface accurately and the size of the road surface drawing apparatus 10 is prevented from increasing.

The angle α formed by the two straight lines connecting the light source 12 and the edges of a subspace may be in, for example, a range from 35° to 65°. If the angle α is larger than 65°, the light source 12 is considered to be too close to the light-transmitting window 20 on the mask 18. If the angle α is smaller than 35°, on the other hand, the light source 12 is considered to be too distant from the light-transmitting window 20 on the mask 18. By configuring the angle α to be, for example, in a range from 35° to 65°, therefore, it is ensured the shape of the light-transmitting window 20 is projected onto the road surface accurately and the size of the road surface drawing apparatus 10 is prevented from increasing.

The plurality of light transmitting windows 20 on the mask 18 are, as shown in FIG. 5, provided on a focal plane 30 of the common projection lens 16 (the plane perpendicular to the light axis O of the projection lens 16 at the focal position). This makes it possible to project the shape of the graphic represented by each light-transmitting window 20 on a projection plane 32 via the projection lens 16, by illuminating the light-transmitting window 20 with the corresponding light source 12. The graphic represented by each light-transmitting window 20 is projected, as shown in FIG. 7A, onto the projection plane 32 such that the position on the mask 18 is inverted vertically and horizontally.

Referring again to FIGS. 3 and 4, the partition 22 partitions the space between the plurality of light sources 12 and the mask 18 into a plurality of subspaces or compartments. The partition 22 may be fixed to the rear surface of the mask 18 and provided between the light sources 12 and the mask 18. In each of the plurality of subspaces partitioned by the partition 22, the light source 12 and the light-transmitting window 20 corresponding to each other are provided. In other words, one light source 12 and the corresponding light-transmitting window 20 are included in one subspace.

In the embodiment, the partition 22 has one vertical plate 22a and one horizontal plate 22b that are orthogonal to each other at the respective middle parts. The space between the light sources 12 and the mask 18 is partitioned horizontally by the vertical plate 22a and also partitioned vertically by the horizontal plate 22b and so is partitioned into four subspaces each having the light source 12 and the light-transmitting window 20.

The partition 22 is a dividing wall that blocks entry of light from a given subspace to another subspace (e.g., the adjacent subspace). In other words, partition 22 blocks the light from each light source 12 from being incident on a light-transmitting window 20 (e.g., the light-transmitting window 20 of the adjacent subspace) different from the light-transmitting window 20 corresponding to the light source 12. For control of light reflection, the surface of the partition 22 may preferably be a low-reflection surface or a non-reflecting surface by being colored black or roughened.

The partition 22 is made of, for example, a metal material but may be made of a resin material or another suitable material. The partition 22 may be made of the same material as that of the mask 18 or made of a different material.

The projection lens 16 projects the light from each of the plurality of light sources 12 transmitted through the light-transmitting window 20. The projection lens 16 is provided as a lens common to the plurality of light sources 12 and the plurality of light-transmitting windows 20. The projection lens 16 may be a compound lens and may be, for example, comprised of three lenses arranged on the light axis O as shown in FIG. 1. By configuring the projection lens 16 as a compound lens, it is possible to correct aberration such as chroma aberration and to project the shape of the light-transmitting window 20 accurately. In the case low cost is of a great concern, the projection lens 16 may be a single lens.

The plurality of light-transmitting windows 20 (and the plurality of light sources 12) may be provided to face the central part of the incidence surface of the projection lens 16. The central part of the incidence surface of the projection lens 16 may be an area around the light axis O that is ⅔ or smaller, ½ or smaller, or ⅓ or smaller than the projection lens radius. This makes it easy to suppress distortion in the projected image caused by aberration of the projection lens 16 more successfully than in the case the light-transmitting window 20 faces the outer circumferential part of the projection lens 16. Further, concentrated arrangement of the plurality of light-transmitting windows facilitates reduction in the size of the road surface drawing apparatus 10.

The projection lens 16 is made of a translucent material such as transparent resin and glass. The projection lens 16 in this embodiment is colorless and transparent but may be colored depending on the drawing that is desired.

The lens holder 24 has a cylindrical shape and holds the projection lens 16 inside. Support of the lens holder 24 by the support member 26 positions the projection lens 16 and the mask 18. The lens holder 24 is directly attached to the support member 26 in this example. The embodiment is not limited to this configuration, and any of various modes of attachment may be adopted. For example, a bracket on which the lens holder 24 is mounted may be provided, and the bracket may be attached to the support member 26.

The support member 26 does not only support the light sources 12, the shade member 14, and the lens holder 24 but is provided as a heat dissipation member (also called a heat sink) for the light sources 12. The light source carrying substrate 13 is fixed to the support member 26 such that the rear surface of the light source carrying substrate 13 is in surface contact with the front surface of the support member 26, and the support member 26 is in thermal contact with the light source 12 and the light source carrying substrate 13. A plurality of heat dissipation fins (not shown) extending rearward may be provided on the rear surface of the support member 26. The support member 26 is made of a metal material such as aluminum and aluminum alloy or any of other high thermal conductivity materials. The heat generated by light emission of the light sources 12 can be dissipated around through the support member 26 so that the light sources 12 and the constituting elements around are prevented from being heated excessively.

A description will be given of the operation of the road surface drawing apparatus 10 according to the embodiment. The light emitted by the light source 12 is shaped in accordance with the shape of the light-transmitting window 20 when transmitted through the light-transmitting window 20 corresponding to the light source 12. The light beam shaped by the light-transmitting window 20 is projected onto the road surface in front of the road surface drawing apparatus 10 via the projection lens 16. Thus, as shown in FIG. 7B, the graphics represented by the light-transmitting windows 20 are drawn in different areas on the road surface. By lighting a particular light source 12 of the plurality of light sources 12 and distinguishing the other light sources 12, the graphic represented by the light-transmitting window corresponding to the lighted light source 12 is projected onto the road surface.

As described above, according to the road surface drawing apparatus 10 of the embodiment, the plurality of light sources 12 are lighted individually to selectively project the graphic represented by the light-transmitting window 20 corresponding to the lighted light source 12 onto the road surface. By distinguishing this light source 12 and lighting a further light source 12, it is possible to switch to and project another graphic represented by the light-transmitting window 20 corresponding to the further light source 12. Thus, the road surface drawing apparatus 10 can draw a plurality of types of images on the road surface.

In accordance with the road surface drawing apparatus 10 of the embodiment, the plurality of subspaces each having the light source 12 and the light-transmitting window 20 are partitioned by the partition 22 to be adjacent to each other and so can be arranged tightly as a whole. By arranging the common projection lens 16 for the plurality of subspaces like these, the road surface drawing apparatus 10 can be compactly designed.

The road surface drawing apparatus 10 can be realized without using DMD and so can be provided inexpensively.

In the drawing apparatus in which DMD is used, a reflector for reflecting the light from the light source toward DMD is provided. In addition, DMD generates a considerable amount of heat during operation so that commensurate cooling features such as a heat sink and a cooling fan are necessary. Meanwhile, the road surface drawing apparatus 10 is not provided with DMD so that such a reflector is not necessary. In addition, the cooling features can be simplified. These factors also facilitate compact design of the road surface drawing apparatus 10 and provision of the apparatus at a low price.

In DMD, a large number of mirror elements are mechanically driven, and the inclination angle of the reflecting surface of each mirror element is controlled to change the graphic drawn. In the road surface drawing apparatus 10, on the other hand, on the other hand, the graphic drawn can be switched by selecting the light source 12 to light. Because the road surface drawing apparatus 10 does not require mechanical driving for switching of the graphic drawn so that failure risk is reduced as compared with a drawing apparatus in which DMD is used.

Figure 8A:
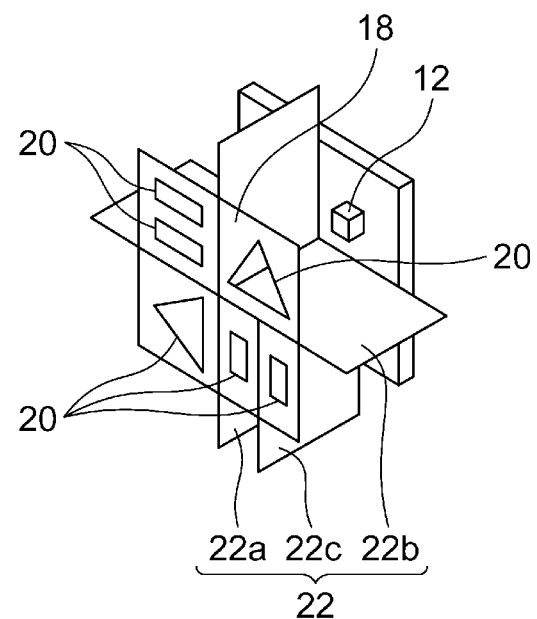
FIG. 8A is a schematic perspective view of another example of the light sources and the shade member inside the road surface drawing apparatus according to the embodiment on an enlarged scale.
Figure 8B:
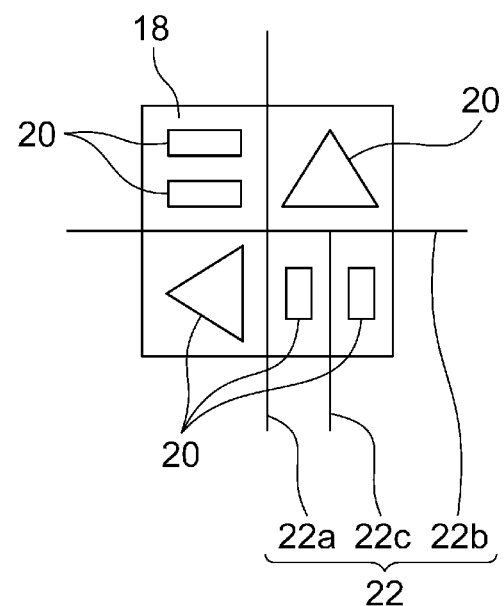
FIG. 8B is a schematic front view of the shade member shown in FIG. 8A.

FIG. 8A is a schematic perspective view of another example of the light sources and the shade member inside the road surface drawing apparatus according to the embodiment on an enlarged scale, and FIG. 8B is a schematic front view of the shade member shown in FIG. 8A.

The mask 18 has, as shown in FIGS. 8A and 8B, a plurality of light-transmitting windows 20. Each of the plurality of light-transmitting windows 20 on the mask 18 is illuminated by the corresponding light source 12 of the plurality of light sources 12. In this example, too, the space between the plurality of light sources 12 and the mask 18 is partitioned by the partition 22 into a plurality of subspaces. The partition 22 has a vertical plate 22a and a horizontal plate 22b, and the space between the light sources 12 and the mask 18 is partitioned horizontally by the vertical plate 22a and also partitioned vertically by the horizontal plate 22b. The partition 22 further has an additional vertical plate 22c to partition the bottom right subspace, of the four subspaces, into two left and right subspaces. In each of these five subspaces, the light source 12 and the light-transmitting window 20 are provided.

By way of one example, one of the two upper light-transmitting windows 20 is shaped in the form of two horizontal lines, and the other is shaped in the form or a triangle. The three lower light-transmitting windows 20 are shaped in the form of a triangle, a vertical line, and a vertical line, respectively. The three lower light-transmitting windows 20 form one left arrow as a whole. As in the case of the top left light-transmitting window 20 shaped in the form of two lines, a plurality of light-transmitting windows 20 may be formed in one subspace depending on the graphic drawn.

In this case, too, the plurality of light sources 12 are lighted individually to selectively project the graphic represented by the light-transmitting window 20 corresponding to the lighted light source 12 onto the road surface.

In addition, at least two light sources 12 of the plurality of light sources 12 may be configured to operate such that the light sources are linked in the timing of lighting and extinguishing. This makes it possible to display an animation on the road surface by lighting or extinguishing at least two light sources 12 in a coordinated manner and using at least two light-transmitting windows respectively corresponding to these light sources 12.

For example, illuminating a plurality of light-transmitting windows 20 arranged on the mask 18 in the sequence of arrangement with the corresponding light sources 12 causes the graphic represented by the light-transmitting windows 20 to be displayed on the road surface in a sequential manner. For example, lighting and extinguishing the light sources 12 corresponding to the three lower light-transmitting windows 20 shown in FIGS. 8A and 8b causes the arrow represented by these three light-transmitting windows to light the road surface in a sequential manner.

Figure 9A:
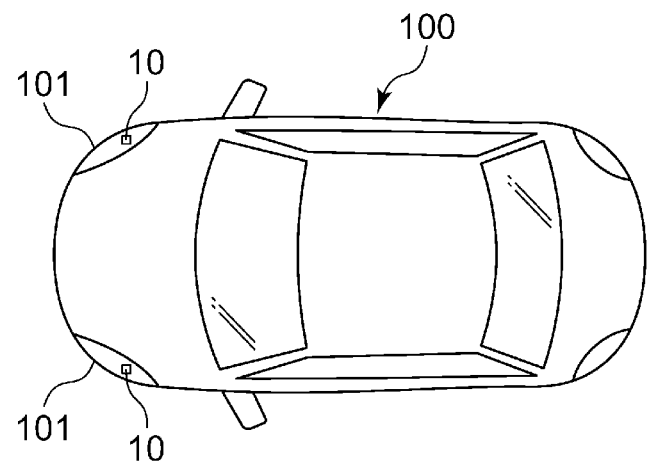
FIGS. 9A-9C schematically show applications of the road surface drawing apparatus according to the embodiment.
Figure 9B:
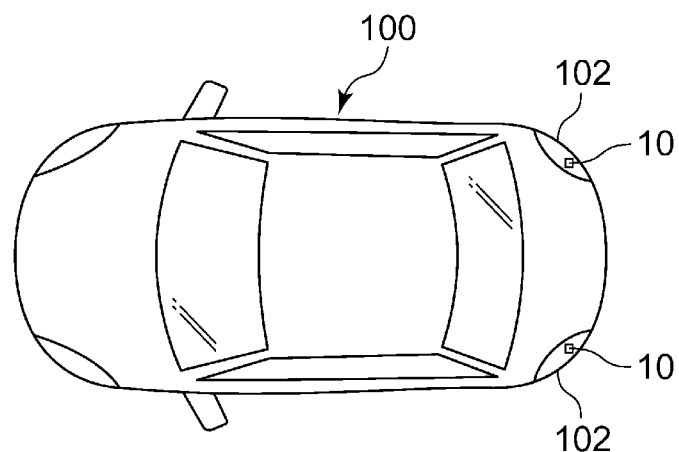
Figure 9C:
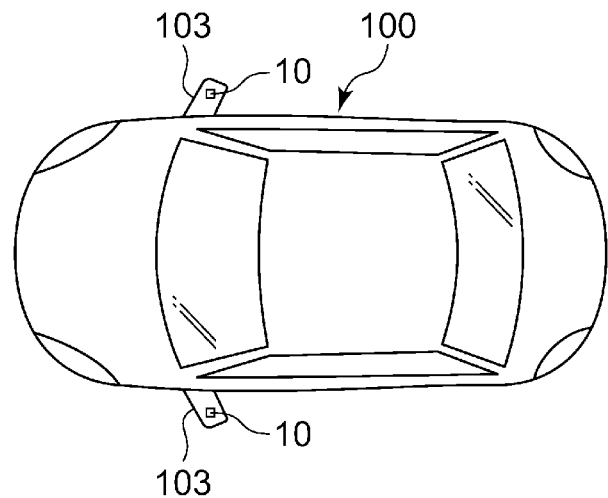

FIGS. 9A-9C schematically show applications of the road surface drawing apparatus according to the embodiment. The road surface drawing apparatus 10 may be, for example, mounted on a vehicle such as an automobile to draw a graphic on the road surface around the vehicle or elsewhere around the vehicle. Alternatively, the road surface drawing apparatus 10 may be mounted on a mobile object other than a vehicle.

For example, as shown in FIG. 9A, the road surface drawing apparatus 10 may be built in a headlamp 101 of a vehicle 100 to draw a graphic on the road surface in front of the vehicle or in the neighborhood thereof. Alternatively, the road surface drawing apparatus 10 may be built in another vehicle lamp such as a fog lamp provided in the front part of the vehicle.

By way of another example, as shown in FIG. 9B, the road surface drawing apparatus 10 may be built in a rear combination lamp 102 or another vehicle lamp provided in the rear part of the vehicle to draw a graphic on the road surface behind the vehicle or in the neighborhood thereof. Alternatively, as shown in FIG. 9C, the road surface drawing apparatus 10 may be built in a side mirror 103 to draw a graphic on the road surface around the vehicle. The road surface drawing apparatus 10 may be built in the side part of the vehicle such as a courtesy lamp or built in another part of the vehicle to draw a graphic on the road surface around the vehicle or elsewhere around the vehicle.

The road surface drawing apparatus 10 may be mounted on a street lamp, a traffic light, a traffic sign, a building or another outdoor fixed structural object or equipment to draw a graphic on the surface around such a fixed structural object or equipment or elsewhere.

The embodiments of the present invention are not limited to those described above and appropriate combinations or replacements of the features of the embodiments are also encompassed by the present invention. The embodiments may be modified by way of combinations, rearranging of the processing sequence, design changes, etc., based on the knowledge of a skilled person, and such modifications are also within the scope of the present invention. The embodiments and variations resulting from such combinations or further modification are also within the scope of the present invention. New embodiments created by combinations of the above-described embodiments and variations and new embodiments created by further modifications to the embodiments and variations provide combined advantages from the embodiments, variations, and further modifications.

Figure 10:
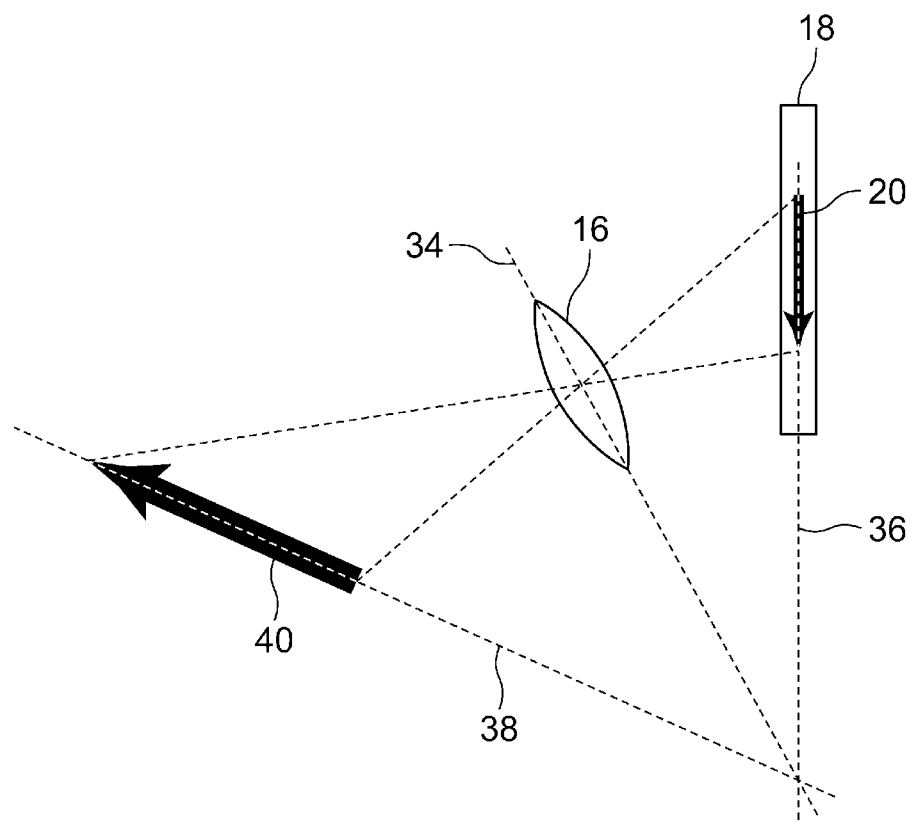
FIG. 10 is a schematic diagram showing an optical system of the road surface drawing apparatus according to variation 1.

(Variation 1) FIG. 10 is a schematic diagram showing an optical system of the road surface drawing apparatus according to variation 1. The light-transmitting window 20 on the mask 18 may be provided on a surface 36 inclined with respect to a principal plane 34 of the common projection lens 16. This results in the light-transmitting window 20 and the projection lens 16 being arranged at an angle to each other so that the light-transmitting window 20, the projection lens 16, and the road surface 38 can be arranged according to the Scheimpflug principle. Distortion of the projected image 40 on the road surface 38 caused by non-parallel (typically, orthogonal) arrangement of the light-transmitting window 20 and the road surface 38 can be reduced.

(Variation 2) The color of light emitted by the light source 12 corresponding to a given light-transmitting window 20 may differ from the color of light emitted by the light source corresponding to another light-transmitting window 20 for the purpose of coloring projected graphics with different colors. Alternatively, a given light-transmitting window 20 may have a color different from that of another light-transmitting window 20. In this case, the light-transmitting window 20 may be covered by a color filter. Alternatively, the mask 18 may be a light-transmitting plate in which an area other than the light-transmitting window 20 is shielded by, for example, a light shielding film, and the light-transmitting window 20 may be a colorless and transparent area or a translucent and colored area on the plate.

(Variation 3) Alternatively, the light source 12 capable of emitting light with a plurality of different colors may be provided to correspond to one light-transmitting window 20. This makes it possible to draw the graphic represented by the light-transmitting window 20 by switching between the plurality of colors.

(Variation 4) In the embodiment described above, one light source 12 is provided to correspond to one light-transmitting window 20. However, a plurality of light sources 12 may be provided to correspond to one light-transmitting window 20 to increase the amount of light illuminating one light-transmitting window 20, for example.

(Variation 5) The arrangement and shape of the partition 22 depends on the arrangement and shape of the light-transmitting windows 20 on the mask 18. When a total of nine light-transmitting windows 20 comprised of three vertical and three horizontal windows are provided on the mask 18, the partition 22 may include two vertical plates 22a and two horizontal plates 22b.

The present invention has been described based on the embodiment by using concrete phrases. The embodiment merely shows an aspect of the principle and applications of the present invention, and a number of variations and arrangement changes may be made to the embodiment without departing from the idea of the present invention defined by the claims.

What is claimed is:

1. A road surface drawing apparatus comprising:
   a plurality of light sources for individually emitting a light;
   a mask comprising a plurality of light-transmitting windows, each light-transmitting window arranged to receive the light from a corresponding light source of the plurality of light sources;
   a partition that partitions a space between the plurality of light sources and the mask into a plurality of subspaces, each subspace allocated for each light-transmitting window and the corresponding light source; and
   a common projection lens arranged to project the light transmitted through each light-transmitting window from the corresponding light source onto a road surface.

2. The road surface drawing apparatus according to claim 1, wherein
   the plurality of light-transmitting windows on the mask is arranged on a focal plane of the common projection lens.

3. The road surface drawing apparatus according to claim 1, wherein
   the plurality of light-transmitting windows on the mask is arranged on a surface inclined with respect to a principal plane of the common projection lens.

4. The road surface drawing apparatus according to claim 1, wherein
   the mask is arranged adjacent to the plurality of light sources such that each light-transmitting window is directly illuminated by the corresponding light source.

5. The road surface drawing apparatus according to claim 4, wherein
a distance from the corresponding light source to the mask is in a range from 3 mm to 8 mm.

6. The road surface drawing apparatus according to claim 4, wherein
an angle formed by two straight lines connecting the corresponding light source and edges of a subspace for the corresponding light source is in a range from 35° to 65°.

7. The road surface drawing apparatus according to claim 1, wherein
the plurality of light-transmitting windows is arranged to face a central part of an incidence surface of the common projection lens.

8. The road surface drawing apparatus according to claim 1, wherein
at least two light sources of the plurality of light sources are configured to operate such that the at least two light sources are linked in timing of lighting and extinguishing.

9. The road surface drawing apparatus according to claim 1, wherein
at least two light-transmitting windows of the plurality of light-transmitting windows have mutually different shapes and/or colors.

10. The road surface drawing apparatus according to claim 1, wherein
each of the plurality of light-transmitting windows is arranged to directly face a central part of an incidence surface of the common projection lens.

11. The road surface drawing apparatus according to claim 10, wherein
the central part of the incidence surface of the common projection lens is defined as an area centered on an optical axis of the common projection lens with a radius of less than ⅔ of a radius of the common projection lens.

* * * * *